Figure 1:
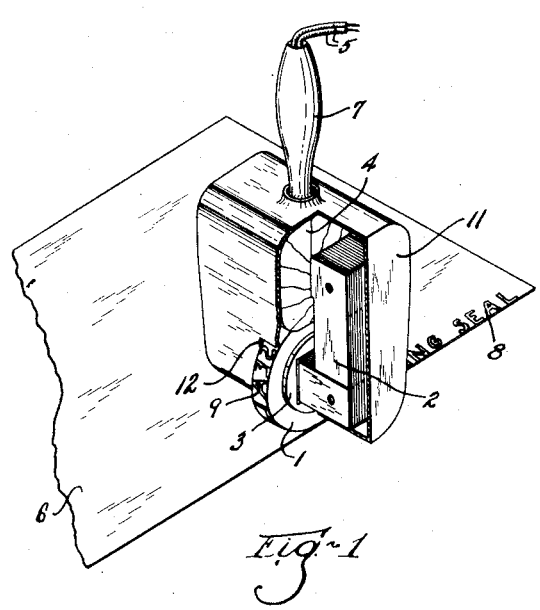

Feb. 11, 1941.   L. E. LOVETT   2,231,132
APPARATUS FOR TREATING PAPER
Original Filed Sept. 8, 1933

INVENTOR
LOUIS E. LOVETT
BY
ATTORNEYS

Patented Feb. 11, 1941

2,231,132

UNITED STATES PATENT OFFICE 2,231,132

APPARATUS FOR TREATING PAPER

Louis E. Lovett, Cleveland Heights, Ohio, assignor to Industrial Rayon Corporation, Cleveland, Ohio, a corporation of Delaware Original application September 8, 1933, Serial No. 688,643. Divided and this application August 11, 1938, Serial No. 224,317

7 Claims. (Cl. 219—30)

This application is a division of application Serial No. 688,643, filed September 8, 1933, for "Method and apparatus for treating paper."

In the manufacture of sheets from materials which possess the property of becoming plastic under heat and/or pressure, such as cellulose nitrate, cellulose acetate, cellulose formate and the like, the sheet is customarily formed as a single thin film. Where it is desired to make up containers, transparent or otherwise, from the sheet, such as bags or sacks for peanuts and other food products, it is necessary to join the edges of a sheet or sheets together in some manner to constitute the bag or sack. This has heretofore been accomplished by sealing the sheets together at their edges by means of some adhesive which is spread between the sheets. If a transparent container is desired, the adhesive is likely to reduce the transparency of the container where applied and, in any case, detracts from its appearance. It has now been found that sheets composed of a compound which becomes plastic when heated, such as cellulose acetate, cellulose nitrate, etc., may be so affected by the application of a heated element thereto that the material at the point of application softens and flows so as to join adjacent sheets together by a bond consisting of the substance of the sheets. That is to say, no separate adhesive medium is necessary to seal sheets of material of this kind together but, on the contrary, the substance of the sheets themselves can be used as the adhesive. In this way, one or two or more sheets can be sealed together around their edges to constitute a container which is transparent or opaque according to the nature of the material chosen.

It is an object of the present invention to provide a method of sealing together the edges of one or more sheets composed of a substance capable of becoming plastic under heat and/or pressure, the sheets being joined together through the coherence of their own substance. Another object of the invention is to provide a container, transparent or otherwise, consisting of one or more sheets of material having the property of becoming plastic under heating and joined together into container form along the margins by the uniting of the substance of the adjacent surfaces. A further object of the invention is to provide an apparatus for readily sealing a plurality of sheets together, with or without impressing a legend or design on the sheets.

The invention is useful in wrapping loaves of bread in a bakery where it is desired to use for wrapping purposes sheets of material of the nature of cellulose acetate and the like. Where waxed paper is used for wrapping bread, the ends of the wrapped loaf are brought into contact with a heated surface which melts the paraffin with which the paper is impregnated and subsequent cooling seals the loaf in the wrapper. This is not possible with cellulose acetate and the like since the heated surface tends to stick and cause crumpling and tearing. The rotatable heating element forming part of the invention may advantageously be used for this purpose since it rolls freely and, while imparting heat thereto for the purpose of forming a seal, does not stick to the wrapping material.

It is, however, difficult to maintain a constant heat in such a rotating element, as must be done if the device is to be continuously operative. To accomplish this purpose, apparatus of the type illustrated in the accompanying drawings has been devised. Such apparatus comprises a transformer in which a primary circuit connected to a source of alternating current produces a magnetic flux in a core upon one side of which is wound said primary circuit and upon the other side of which is mounted the rotatable heating element, which constitutes a secondary circuit and is heated by induced current passing therethrough in an axial direction. In this way, such element can be rotated continuously without interference with its movement by the necessary heating means.

Figure 2:
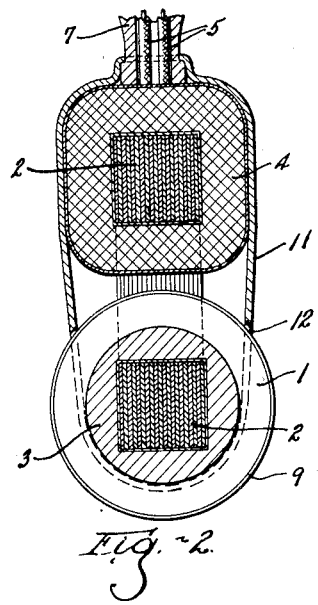
Figure 3:
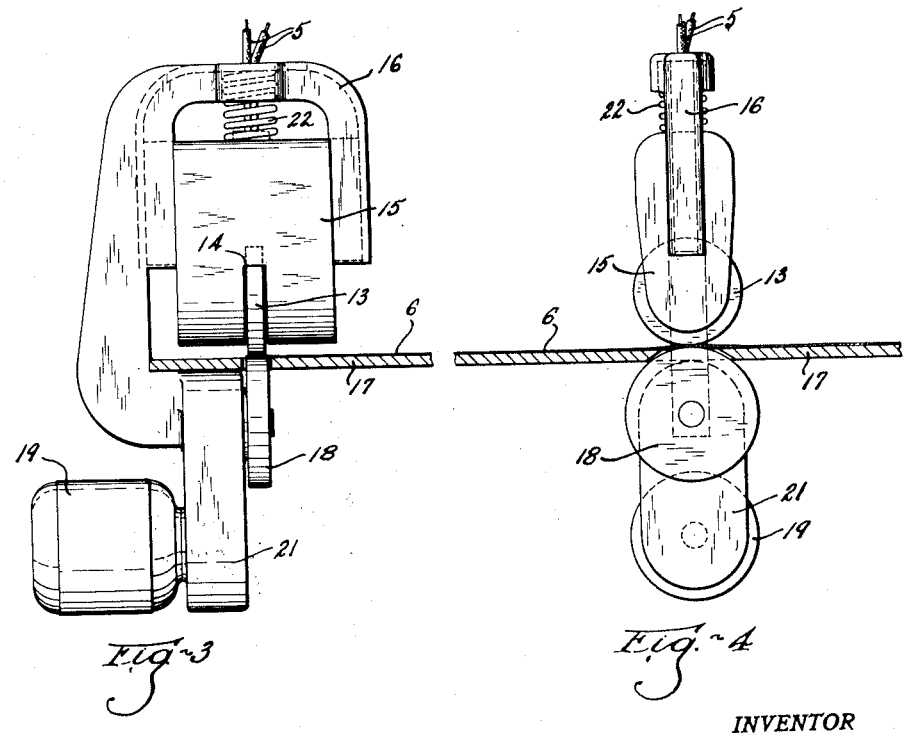
Figure 4:
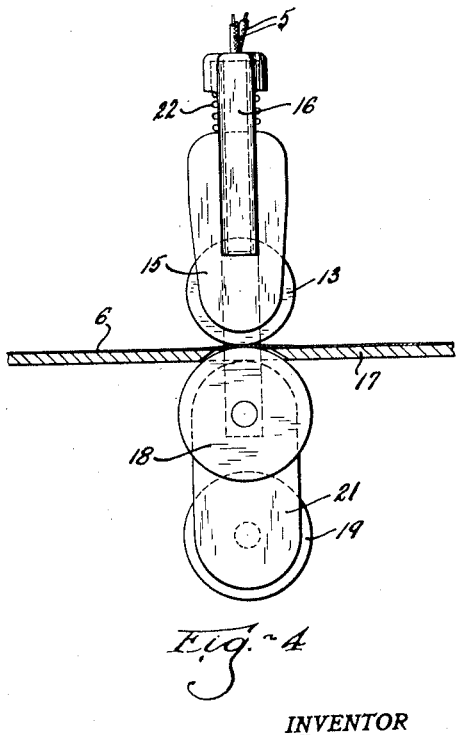

Such an electrically heated device can assume various forms, as will be apparent, and two such forms have been set forth in the accompanying drawing for purposes of illustration. In said drawing: Fig. 1 is a perspective of a heating device suitable for hand use as applied to sheets capable of being sealed together by their own substance; Fig. 2 is an enlarged transverse section taken through the device shown in Fig. 1; Fig. 3 is a diagrammatic view of a machine embodying the principles of the invention and suitable for larger scale production; and Fig. 4 is an end view of the apparatus shown in Fig. 3.

Referring to Figs. 1 and 2 of the drawing, the apparatus there shown is intended for manual use and comprises a ring 1 of steel or other suitable material mounted on a laminated transformer core 2 by means of a bearing 3 of heat-resisting material. Around the opposite side of the core 2 is disposed a primary winding 4 to which current may be supplied through the leads 5. An alternating current passing through the primary winding 4 will induce a secondary current in the ring 1. Since the ring in effect constitutes a winding of but a single turn, it will become heated by the induced current and this heat can be imparted to the edges of two superimposed sheets 6 of a material capable of being self-sealed, such as cellulose acetate film.

The device can be manipulated and pressure applied by means of the handle 7 through which the lead wires 5 may be passed. Since the heat for the ring 1 arises from the induced current therein, there are no parts which require contact with the ring in order to transmit heat thereto and it is free to rotate on its bearing 3. Consequently, the device can be rolled over the edges of the double sheet 6 continuously without stopping to reheat the heating element. A suitable casing 11 is supplied in order to cover the various parts of the transformer mechanism, the ring 1 projecting through a slot 12 provided in such casing for the purpose.

If it is desired to apply a legend 8 to the sheet, corresponding characters 9 may be formed in the periphery of the ring 1, in reverse, and the heating element will then impress the desired legend as it seals the two sheets together.

The action of the heating element is to soften or melt the material of which the sheet is made up, examples of such materials being cellulose nitrate, cellulose acetate, cellulose formate and the like. The material of each sheet then joins with the material of the neighboring sheet and the two are securely sealed together by their own substance, the plasticized material setting immediately after the removal of the heat and pressure. The sealing operation may be performed around the edges of the sheets or both around the edges and across the width at regular intervals, the composite sheet then being severed at the transversely sealed strips in order to provide a number of smaller sheets sealed around their edges which can be made up into bags.

For certain types of work on which it is desired to perform the sealing operation more rapidly, the device illustrated in Figs. 3 and 4 may be employed. It comprises a ring 13 rotatably mounted about one side of a transformer core so as to be electrically heated in a manner similar to that of ring 1 in the device of Figure 1. Ring 13 projects through a slot 14 in a casing 15 which is mounted in a frame 16. A table 17 is positioned beneath the ring 13 and is slotted to receive a portion of a roller 18 mounted therebelow. Roller 18 is driven by a motor 19 through a gear box 21 and contacts with the ring 13 which is urged thereagainst by a spring 22. Sheets composed of the above-mentioned materials or of a material having similar properties are laid on the table 17 and passed between the ring 13 and the roller 18 to be quickly sealed together along their edges by the heat from the ring 13 under the pressure exerted by the spring 22.

The invention is thus applicable to the manufacture of bags or other containers, such as bread wrappers, made from sheet materials having the property of becoming plastic under heat and/or pressure, especially where a transparent wrapper is desired. The cellulose esters are examples of suitable materials from which such sheets may be made up and possess the property of joining together when heated, with or without the application of pressure. The rotatable heating means is especially desirable in handling such materials since the plastic nature of the heated sheet causes it to stick to the surface of any heating element which is not rotatable.

It is intended that the patent shall cover, by suitable expression in the appended claims, whatever features of patentable novelty reside in the invention.

What is claimed is:

1. Sealing apparatus comprising a core; a primary winding on said core; bearing means disposed about said core; and, rotatably mounted upon said bearing means, a metallic ring adapted to be heated by induced current constituting a closed secondary circuit in relation to said primary winding, said ring being so disposed that it has rolling contact with the material to be sealed.

2. Sealing apparatus comprising a core; a primary winding disposed about one portion of said core to which primary winding is supplied an alternating current; bearings disposed about another portion of said core; and, rotatably mounted on said bearings, a steel ring which in relation to said primary winding constitutes a closed secondary circuit, said ring being heated by induced current.

3. Sealing apparatus comprising a core; a primary winding disposed about one portion of said core to which primary winding is supplied an alternating current; bearing means disposed about another portion of said core; and a metallic ring constituting a closed secondary circuit rotatably mounted on said bearing means, said ring bearing upon its periphery a plurality of characters so disposed that said characters contact with and impress a legend into the material to be sealed.

4. A branding device comprising a transformer core, a primary winding associated therewith, and a branding wheel comprising a metallic annulus having branding portions rotatably mounted with reference to the core so that most of the magnetic flux produced in the latter passes through the wheel in a substantially axial direction to heat the same by induced current.

5. A branding device comprising a transformer core, a primary winding associated therewith, and a branding wheel comprising a metallic annulus journalled on the core so that most of the magnetic flux produced in the latter passes through the wheel in a substantially axial direction to heat the same by induced current.

6. Sealing apparatus comprising a housing enclosing a transformer core, a primary circuit disposed about one side of said core, and a rotatable metallic ring mounted about the other side of said core constituting a secondary circuit, said ring having at least a portion of its circumference extending through said housing.

7. Sealing apparatus comprising a housing enclosing a transformer core, a primary circuit disposed about one side of said core, and a rotatable metallic ring mounted about the other side of said core constituting a secondary circuit, said ring having at least a portion of its circumference extending through said housing; a roller outside said housing; and means for supporting said housing in such manner that said metallic ring is maintained in juxtaposition to said roller.

LOUIS E. LOVETT.